(12) United States Patent
Kohlmeier-Beckmann et al.

(10) Patent No.: US 7,002,488 B2
(45) Date of Patent: Feb. 21, 2006

(54) LIGHT GUIDANCE SYSTEM FOR GUIDING AN AIRCRAFT SERVICE VEHICLE TO A PARKING POSITION ADJACENT TO AN AIRCRAFT

(75) Inventors: Carsten Kohlmeier-Beckmann, Buxtehude (DE); Juergen Riekehof-Boehmer, Hamburg (DE); Lars Rowold, Wiefelstede (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/915,244

(22) Filed: Aug. 9, 2004

(65) Prior Publication Data

US 2005/0035881 A1 Feb. 17, 2005

(30) Foreign Application Priority Data

Aug. 8, 2003 (DE) ................................ 103 36 467

(51) Int. Cl.
*G08B 21/00* (2006.01)
(52) U.S. Cl. ..................... 340/958; 340/945; 340/947; 340/431; 340/932.2; 342/63; 701/301
(58) Field of Classification Search ................ 340/958, 340/431, 932.2, 945, 947, 955, 953, 425.5, 340/436, 901; 701/301.1; 342/63, 54, 62
See application file for complete search history.

(56) References Cited

U.S. PATENT DOCUMENTS

| 4,015,235 A | * | 3/1977 | Demaine et al. ............ 340/958 |
| 4,464,648 A | * | 8/1984 | Smith et al. ............. 340/932.2 |
| 4,856,896 A | * | 8/1989 | Farr ........................... 356/153 |
| 5,825,305 A | * | 10/1998 | Biferno ...................... 340/958 |

* cited by examiner

*Primary Examiner*—Jeffery Hofsass
*Assistant Examiner*—Daniel Previl

(74) *Attorney, Agent, or Firm*—W. F. Fasse; W. G. Fasse

(57) ABSTRACT

A guidance system guides a driver to drive a service vehicle, such as a baggage loading vehicle, into a prescribed parking position adjacent to an aircraft without colliding with the aircraft. The guidance system includes at least two indicator markers, preferably marker lights, arranged spaced apart from one another on the aircraft. The two markers present a prescribed visual pattern, e.g. an alignment of the two markers, along a line of sight defining a safe approach path. If the driver steers along this safe approach path so that he sees the prescribed visual pattern of the markers, then a collision between the vehicle and the aircraft will be avoided. Alternatively, a projector projects a light pattern such as a projected boundary marker line onto the ground surface adjacent to the aircraft to mark a safe collision-free approach path.

19 Claims, 7 Drawing Sheets

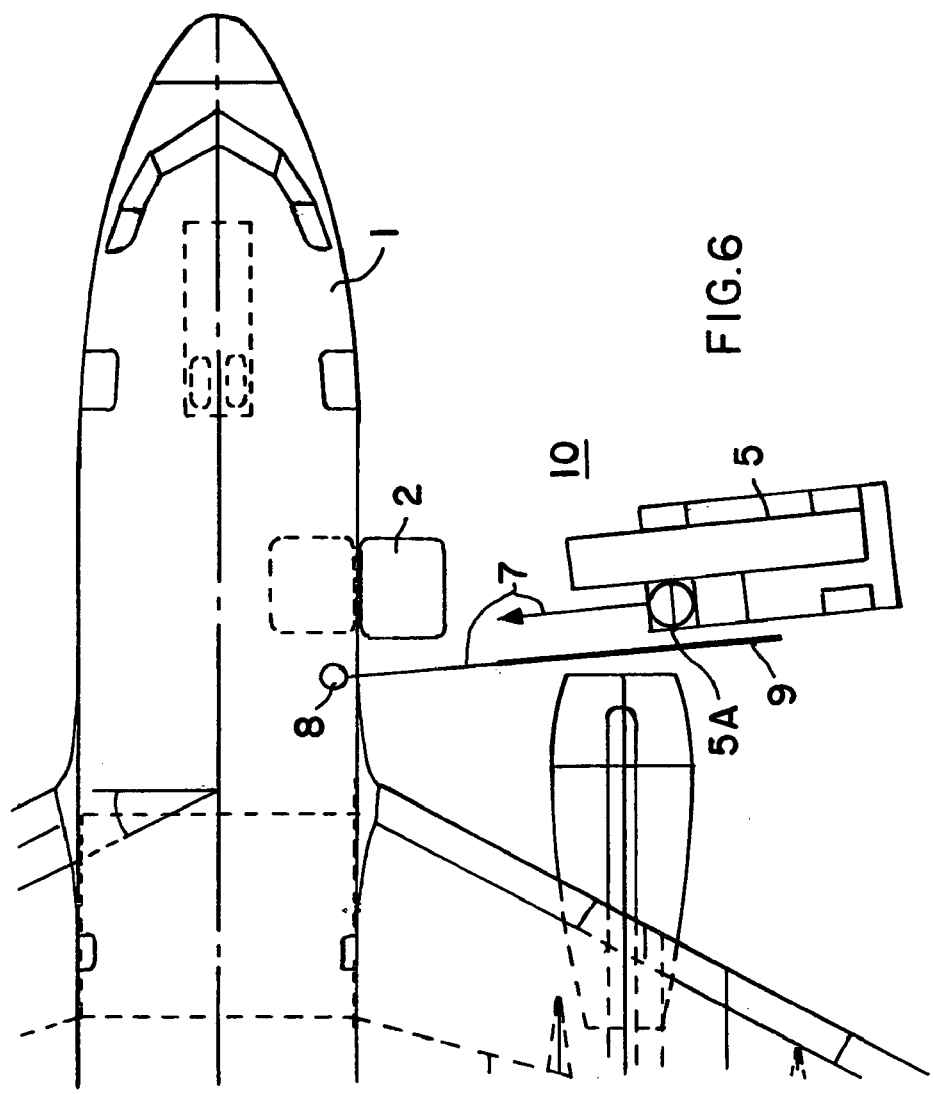

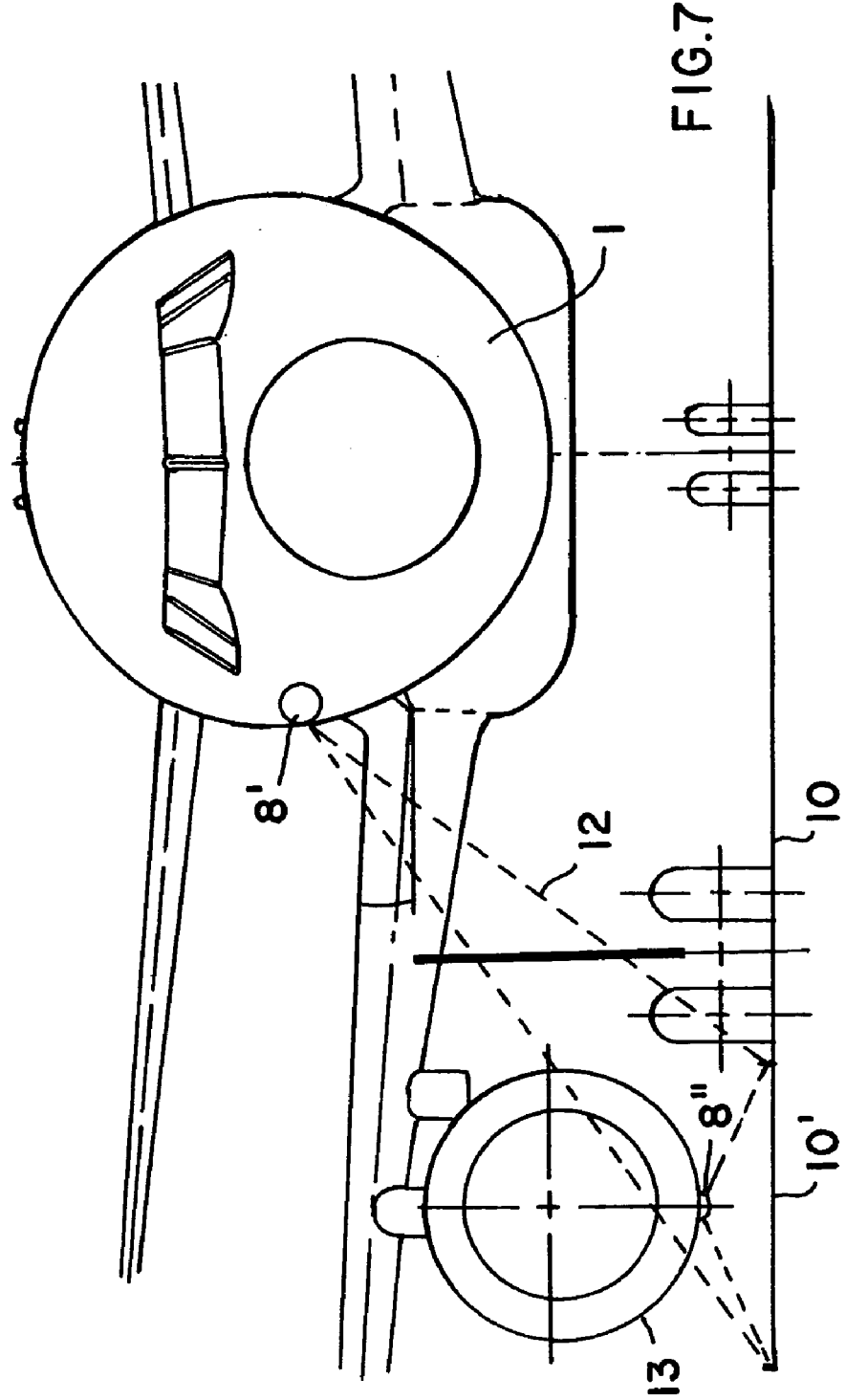

LIGHT GUIDANCE SYSTEM FOR GUIDING AN AIRCRAFT SERVICE VEHICLE TO A PARKING POSITION ADJACENT TO AN AIRCRAFT

PRIORITY CLAIM

This application is based on and claims the priority under 35 U.S.C. §119 of German Patent Application 103 36 467.6, filed on Aug. 8, 2003, the entire disclosure of which is incorporated herein by reference.

FIELD OF THE INVENTION

The invention relates to a guidance system for guiding an aircraft service vehicle into a prescribed parking position adjacent to an aircraft for servicing the aircraft.

BACKGROUND INFORMATION

The ground servicing of aircraft requires a number of different specialized aircraft service vehicles that must be driven to the parked aircraft and then parked in a proper predefined parking position relative to the aircraft, in order to carry out their specialized service tasks. For example, such an aircraft service vehicle may especially be a baggage or cargo loading vehicle that is driven perpendicularly relative to the aircraft longitudinal axis into a parking position beside an open cargo hold door, and then parked in this designated parking position. From there, baggage is transported into the cargo hold of the aircraft by means of an inclined conveyor belt on the vehicle.

Another example of an aircraft service vehicle is a freight lift vehicle that lifts cargo or freight load units to an open cargo hold door, for the load units then to be loaded into the cargo hold of the aircraft. Yet another example of an aircraft service vehicle is a catering service vehicle that lifts catering containers storing catering trolleys and catering service items to an open door for loading the catering items onto the aircraft. Still other examples of aircraft service vehicles include aircraft maintenance vehicles, aircraft refueling vehicles, passenger boarding stairway vehicles, ground-based mobile power units or electrical generator units, ground-based mobile air conditioning units, or the like.

All of these service vehicles must be driven into the immediate proximity of the aircraft and parked in a predefined parking location relative to the aircraft, in order to carry out their various service tasks. In this regard there is a risk, due to steering errors by the driver of the vehicle, that the vehicle will collide with a component of the aircraft, especially for example, an engine of the aircraft. Needless to say, any such collision can cause significant damage, which may result in increased downtime of the aircraft. In any event, any collision, regardless how minor, requires a thorough inspection of the affected aircraft component or components.

SUMMARY OF THE INVENTION

In view of the above, it is an object of the invention to provide a guidance system that assists or guides the driver of an aircraft service vehicle to recognize, and steer the service vehicle along, a safe approach path to the specified parking position while avoiding a collision between the service vehicle and any part of the aircraft. It is a further object of the invention to provide such guidance for the driver of a service vehicle already during the driving approach to the aircraft from a distance away from the final parking position. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a guidance system for guiding an aircraft service vehicle into a parking position adjacent to an aircraft. According to a first embodiment of the invention, the guidance system includes at least two position or bearing indicator markers arranged spaced apart from one another on the aircraft at locations that are visible from a defined approach path leading to the parking position adjacent to the aircraft. Particularly, the two position or bearing indicator markers produce a prescribed visual pattern along a line of sight defining the approach path, so that this prescribed visual pattern of the indicator markers is visible to the driver of the service vehicle driving along the approach path to the parking position. By appropriately steering the service vehicle along the approach path, the proper visual pattern of the indicator markers is maintained in the view of the driver. On the other hand, if the driver steers the vehicle out of the defined approach path, then the proper visual pattern of the indicator markers will not be maintained, and thereby the driver is given a visual indication that the vehicle is straying out of the defined approach path.

For example, in the simplest embodiment, two bearing indicator markers are arranged and positioned relative to one another on the aircraft so that they are visually aligned with one another along a line of sight that defines the safe approach path. Thus, in this case, the prescribed visual pattern is a pattern of the two indicator markers aligned at least vertically, i.e. on a vertical line or plane, with each other, in the view of the driver of the service vehicle as it drives along the approach path. Another type of alignment of the indicator markers is the superposed registration or overlap of one marker behind the other along the line of sight defining the safe approach path.

A somewhat more complicated arrangement involves a first indicator marker visually positioned between two other indicator markers along the line of sight defining the safe approach path, i.e. in the view of the driver when the vehicle is being steered properly along the defined approach path. In this arrangement (as in the above simpler arrangement), the first marker and the two other markers may have different colors to improve the visual recognizability of the prescribed visual pattern. As an example, the driver will see a pattern of a white marker centered between two red markers if the vehicle is being steered along the proper approach path.

Preferably, the indicator markers comprise marker lights that are arranged on or in the aircraft. Alternatively, the indicator markers are not lights but other visually apparent markers such as reflectors. Thereby it is preferred that, for example, two marker lights are arranged one behind the other at the greatest possible or practical horizontal spacing distance in a direction along the defined approach path, e.g. a direction perpendicular to the aircraft longitudinal axis. The horizontal spacing distance between the two marker lights is preferably at least 1 m, more preferably at least 1.5 m, or even at least 2 m.

In any event, the indicator markers, or e.g. particularly the marker lights, define the proper safe approach path for the service vehicle to follow to the parking position in order to surely prevent a collision of the service vehicle with any part of the aircraft. This safe approach path is defined by the line of sight along which the proper prescribed visual pattern of the indicator markers or marker lights is visible to a driver of a service vehicle. In this regard, the particular design of the approach path, and thus the particular locations of the indicator markers on the aircraft and relative to each other can take into account the particular dimensions, configuration, driver position, and the like of the particular service vehicle to be guided by this set of marker indicators. Plural sets of marker indicators can be provided for respectively presenting prescribed visual patterns along distinct lines of sight for guiding different service vehicles.

Advantages of the above described first embodiment of the invention are given by the extreme simplicity of the guidance system, e.g. merely requiring two position or bearing indicator markers arranged on and/or in the aircraft. This guidance system is insensitive with respect to a dis-adjustment over time, i.e. once the markers are properly installed they remain at their fixed locations and no future re-adjustments will be necessary. The proper approach path can be defined at any required angle relative to the aircraft, including both a perpendicular approach path (relative to the aircraft longitudinal axis) as well as a range of non-perpendicular angled approach paths. The indicator markers or marker lights are simple, economical, and easy to identify by the driver of the service vehicle. Also, the indicator markers or marker lights simply need to be visually observed by the driver in his or her ordinary field of view, i.e. in combination with the other normal environmental visual cues used by the driver for steering the vehicle. In other words, the present inventive guidance system is not an exclusive guidance system, but rather a supplemental guidance system that assists the driver without detracting from any of the other visual information normally considered by the driver when steering the vehicle (e.g. the perceived positions of components of the aircraft, such as the engines, the perceived position of the open cargo door of the aircraft, the perceived peripheral boundaries of the service vehicle, etc.).

According to a second embodiment of the invention, at least one light projector arrangement or device is mounted on the aircraft so as to project light in a prescribed pattern onto the ground surface adjacent to the aircraft in order to mark a safe collision-free approach path to the specified parking position and/or to identify boundaries of the safely travelable collision-free area of the ground surface on which the aircraft is parked. For example, this may particularly involve projecting visually apparent lines of light along the side boundaries of the proper approach path, so that a driver of the vehicle simply needs to steer the vehicle beside or between the illuminated side boundary lines. Alternatively, the pattern of projected light can be a defined or distinct area illumination of a safe zone or approach path, so that the driver simply needs to keep the vehicle within the illuminated safe zone.

The light projector arrangement preferably includes a light source such as a flash lamp, a laser, light emitting diodes, incandescent lamps or light bulbs, or discharge lamps, as well as an optical system involving lenses, collimators, apertures, diaphragms, shutters or the like for projecting the emitted light in the prescribed pattern at the prescribed location or locations on the ground surface.

An advantage of this embodiment of the invention is that the installation of a light projector arrangement on the aircraft is very simple and uses simple components, yet can reliably avoid the glaring or blinding projection of light directly at the driver of the service vehicle. In this regard, for example, the light projector arrangement can be located below or on the bottom side of an engine intake of an engine nacelle, or at a location significantly above the working eye level of the driver. Another advantage of this embodiment of the invention is that it is entirely independent of the type, configuration, dimensions, driver position and the like of the particular vehicle. Also, the projected illuminated markings are uniformly or similarly informative from all directions as the vehicle drives toward the aircraft from a distance before entering the approach path to the parking position proximate to the aircraft. In other words, the driver can already see the projected light marking the approach path on the ground surface, even before the vehicle enters and aligns with the approach path.

A further significant advantage of all embodiments and features of the invention is that the guidance is always provided relative to the aircraft. Thus, this guidance system is not dependent on or influenced by the proper (or improper) parking position of the aircraft relative to the ground surface. In other words, even if the aircraft is not parked precisely at its proper parking position, the approach path guidance provided for the service vehicle will always be precisely defined relative to the aircraft itself. This would not be the case for any vehicle guidance system that is arranged on the ground or that provides guidance information relative to the ground.

BRIEF DESCRIPTION OF THE DRAWINGS

In order that the invention may be clearly understood, it will now be described in connection with example embodiments thereof, with reference to the accompanying drawings, wherein:

FIG. 6 is a view similar to FIG. 5 of the second embodiment of the invention, but for a non-perpendicular angled approach path of the vehicle to the aircraft; and FIG. 7 is a schematic front elevation view of a portion of an aircraft equipped with the second embodiment of the inventive guidance system, including a light projection arrangement that illuminates the approach path on the ground surface on which the aircraft is parked.

DETAILED DESCRIPTION OF PREFERRED EXAMPLE EMBODIMENTS AND OF THE BEST MODE OF THE INVENTION

Figure 1:
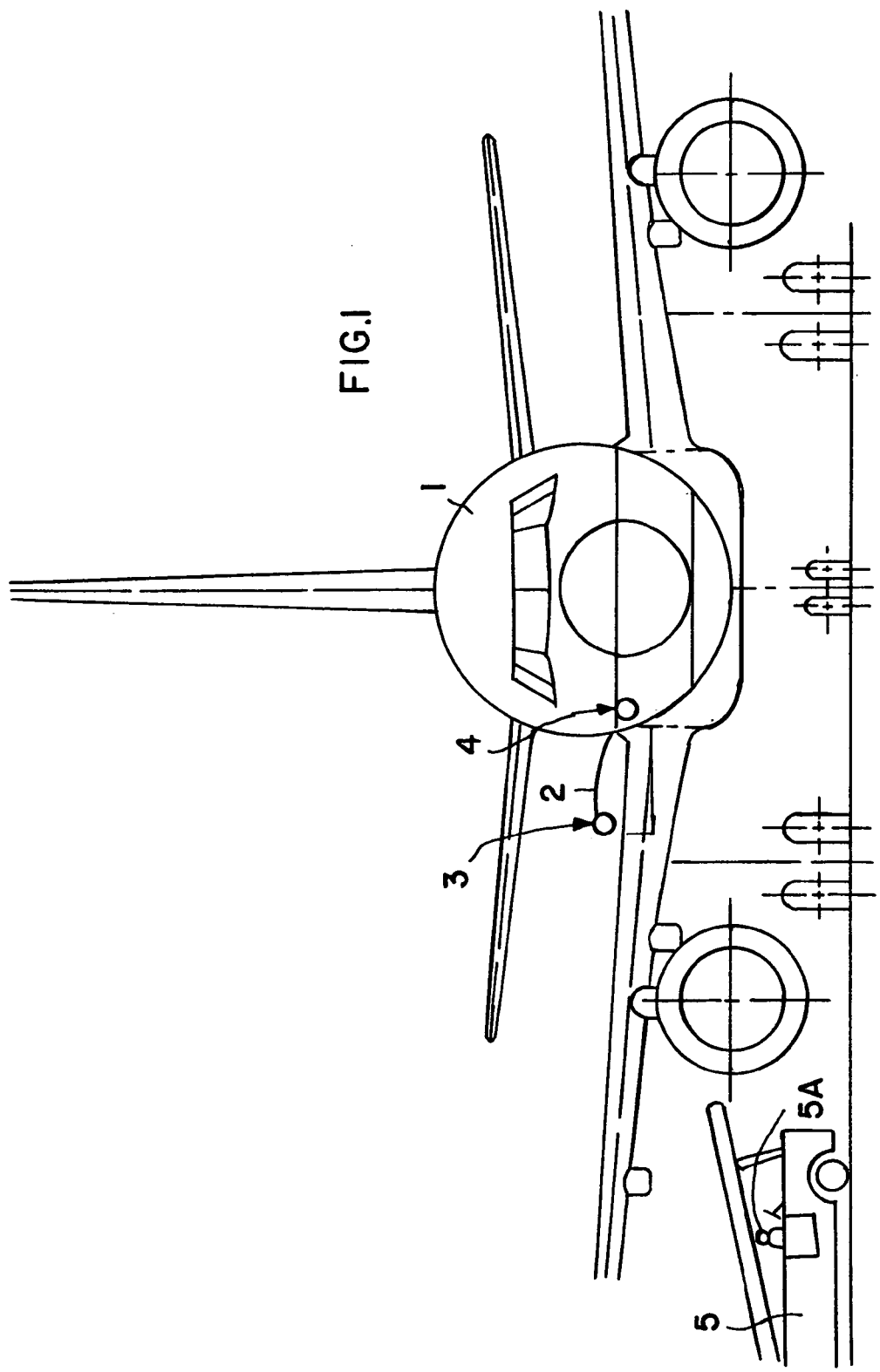
FIG. 1 is a schematic front elevation view of an aircraft with an open cargo hold door, having an inventive guidance system including a first marker light arranged on the cargo door and a second marker light arranged in the cargo hold.

FIG. 1 schematically shows a front elevation view of an aircraft 1 having a cargo hold door 2 that is open to provide access to a freight, cargo or baggage hold (not shown in detail) of the aircraft 1. A first marker light 3 is mounted to the door 2 at the lower edge thereof, i.e. the free swingable edge that is swung outwardly and upwardly away from the aircraft 1 when opening the door 2. A second marker light 4, forming a cooperating pair with the first marker light 3, is arranged in the cargo hold of the aircraft 1.

As can be seen in FIG. 1, the marker lights 3 and 4 are arranged spaced apart from one another at a substantial horizontal spacing distance therebetween, e.g. in this case a horizontal spacing distance corresponding to the length of the open cargo hold door 2 extending away from the aircraft 1, which is typically more than 1 m or even more than 1.5 m or even 2 m. A large spacing distance between the marker lights 3 and 4 is preferred, because it improves the angular resolution of the guidance provided by the system. Furthermore, the two marker lights 3 and 4 are arranged so that they are visible in the field of view or line of sight of a driver 5A of an aircraft service vehicle 5 that is approaching the aircraft 1 from the side.

Figure 2:
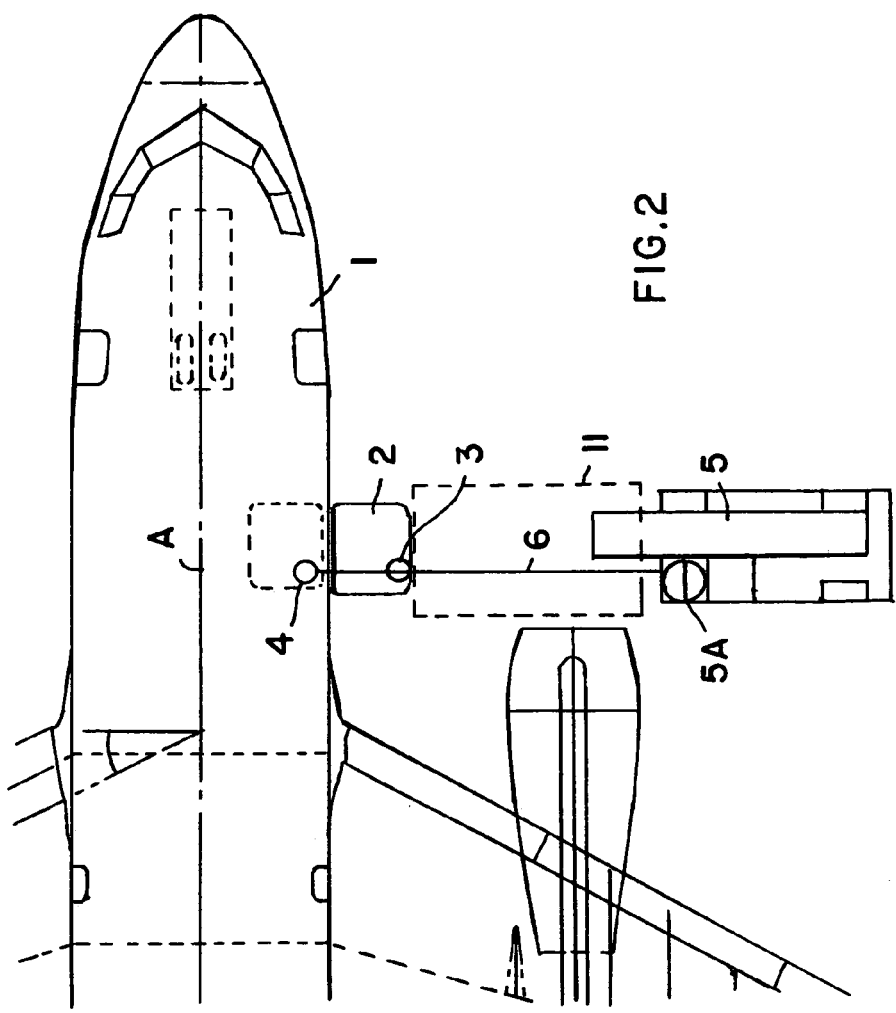
FIG. 2 is a schematic top plan view of a portion of the aircraft of FIG. 1, showing an example approach path of a service vehicle perpendicular to the aircraft longitudinal axis.

More particularly, as can be seen in the top plan view of FIG. 2, the two marker lights 3 and 4 are positioned relative to each other with reference to a horizontal plane so as to provide a particular or prescribed visual pattern of the two marker lights 3 and 4 relative to each other along the line of sight of the driver 5A of the service vehicle 5. In the present example embodiment, the two marker lights 3 and 4 are aligned with each other on a vertical plane extending along the intended safe approach path 6. Thus, the visual pattern presented by the two marker lights 3 and 4 along the line of sight defining the approach path 6 is that of an alignment of the two lights with each other, and particularly an apparent vertical alignment of the first marker light 3 vertically above the second marker light 4 (see FIGS. 1 and 2). Alternatively, the two marker lights 3 and 4 may be superimposed or in registration on one another along a particular line of sight that defines the safe collision-free approach path 6. In any event, whatever specified visual pattern is presented by the marker lights 3 and 4, the line of sight or optical axis along which this pattern is established in the view of the driver 5A of the service vehicle 5 defines the safe approach path 6. This line or approach path 6 defines the proper angle and position of the approaching vehicle 5 relative to the aircraft 1.

In the example of FIG. 2, if the driver 5A steers the vehicle 5 too far to the right, i.e. out of the proper safe approach path 6 toward the right, then the two marker lights 3 and 4 will no longer appear in the proper visual pattern, e.g. will no longer appear superimposed or vertically aligned with one another. Instead, the second marker light 4 will appear shifted or offset toward the right from the first marker light 3. On the other hand, if the vehicle 5, i.e. the driver 5A, deviates from the safe approach path 6 toward the left, then the second marker light 4 will appear shifted or offset toward the left from the first marker light 3.

To assist the driver 5A in distinguishing between the two lights 3 and 4, they may respectively have different colors. For example, in an embodiment or arrangement in which the marker lights 3 and 4 are positioned to provide a registration or overlap of the two lights along the line of sight defining the safe approach path 6, the first marker light 3 may be green and the second marker light 4 may be red. With such an arrangement, if the driver 5A only sees the green light 3, then he is proceeding along the proper safe approach path 6. On the other hand, if the driver 5A sees the red light 4 "peeking out" from behind the green light 3, toward the right or the left side, this tells the driver 5A that he is straying toward the right or the left, respectively, from the safe approach path 6. Similar considerations apply when the two lights are not in registration or overlapping one another but rather merely vertically aligned with one another along the line of sight defining the safe approach path 6.

Many variations or modifications are possible. Instead of one pair of marker lights 3 and 4, two or more pairs of such marker lights can be arranged on the aircraft to provide additional guidance for the driver 5A of the vehicle 5, or to provide the respective proper guidance for different types of vehicles. In each case, various different installation locations on the aircraft 1 are possible. For example, the marker lights may be arranged on the cargo hold door 2 as described above, on the cargo hold door opening threshold, at various locations within the cargo hold, directly on the outside of the fuselage belly, and/or directly on the outside of the side surface of the fuselage of the aircraft 1. By providing such plural pairs of marker lights that are respectively located to provide guidance for different types or configurations of service vehicles, the guidance system remains permanently in place and does not require any changes or adjustments for guiding such different vehicles.

The marker lights 3 and 4 may comprise, for example, light emitting diodes or luminescent lamps. In this regard, luminescent lamps are especially advantageous for mounting on the outer surface of the fuselage of the aircraft 1, because they are quite thin and easy to mount surfacially on the fuselage, so that they have only a minimal influence on the outer contour of the aircraft.

As can be seen in FIG. 2, the marker lights 3 and 4 are precisely positioned so that the line of sight (optical axis) or vertical plane on which they are aligned defines the safe approach path 6 for the vehicle 5 to follow to reach its prescribed parking location 11. This safe approach path 6 is pre-defined for a particular type, configuration, and dimensions of the vehicle 5, to ensure that there will be no collision but rather a safe clearance between the vehicle 5 and all parts of the aircraft 1. This also takes into account the intended approach direction of this particular vehicle 5.

Figure 3:
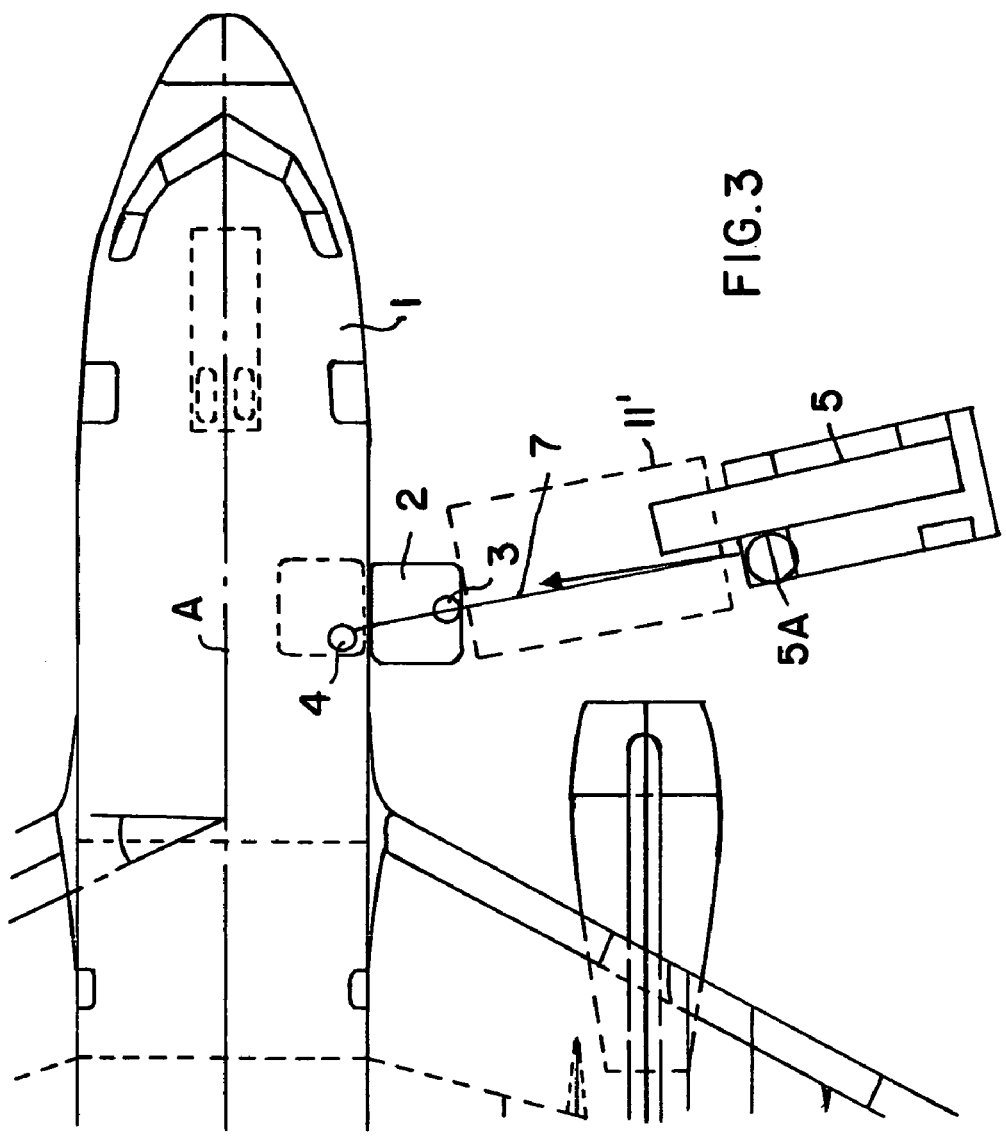
FIG. 3 is a top plan view similar to FIG. 2, but showing a non-perpendicular angled approach path of a service vehicle relative to the aircraft.

For example, FIG. 2 shows a perpendicular approach path 6 extending perpendicularly relative to the longitudinal axis A of the aircraft to reach the perpendicular parking position 11. On the other hand, FIG. 3 shows a different arrangement of the marker lights 3 and 4 to define an angled approach path 7 for the same vehicle 5. Namely, this approach path 7 does not approach the aircraft perpendicularly but at a steep non-perpendicular angle (e.g. 50 to 85°) relative to the aircraft longitudinal axis A, to be parked in a parking position 11' that is similarly oriented at a steep non-perpendicular angle as shown in FIG. 3.

Since the particular visual alignment or visual pattern of the marker lights 3 and 4 defining the safe approach path 6 or 7 is defined for the line of sight or at least the vertical plane of sight of the driver 5A of the vehicle, the layout and arrangement of the marker lights 3 and 4 must take into account the driver's seating position on the vehicle. This is given, for example, by the location of the driver's seat, steering wheel, and other driving controls of the respective vehicle. The particular physical stature and the like of the particular driver does not need to be taken into account, i.e. is not significant, within the range of operating accuracy of the inventive system. Instead, a vertical plane that passes through the driver's seat or the steering wheel of the vehicle can be taken as the vertical plane of the line of sight of the driver.

Figure 4:
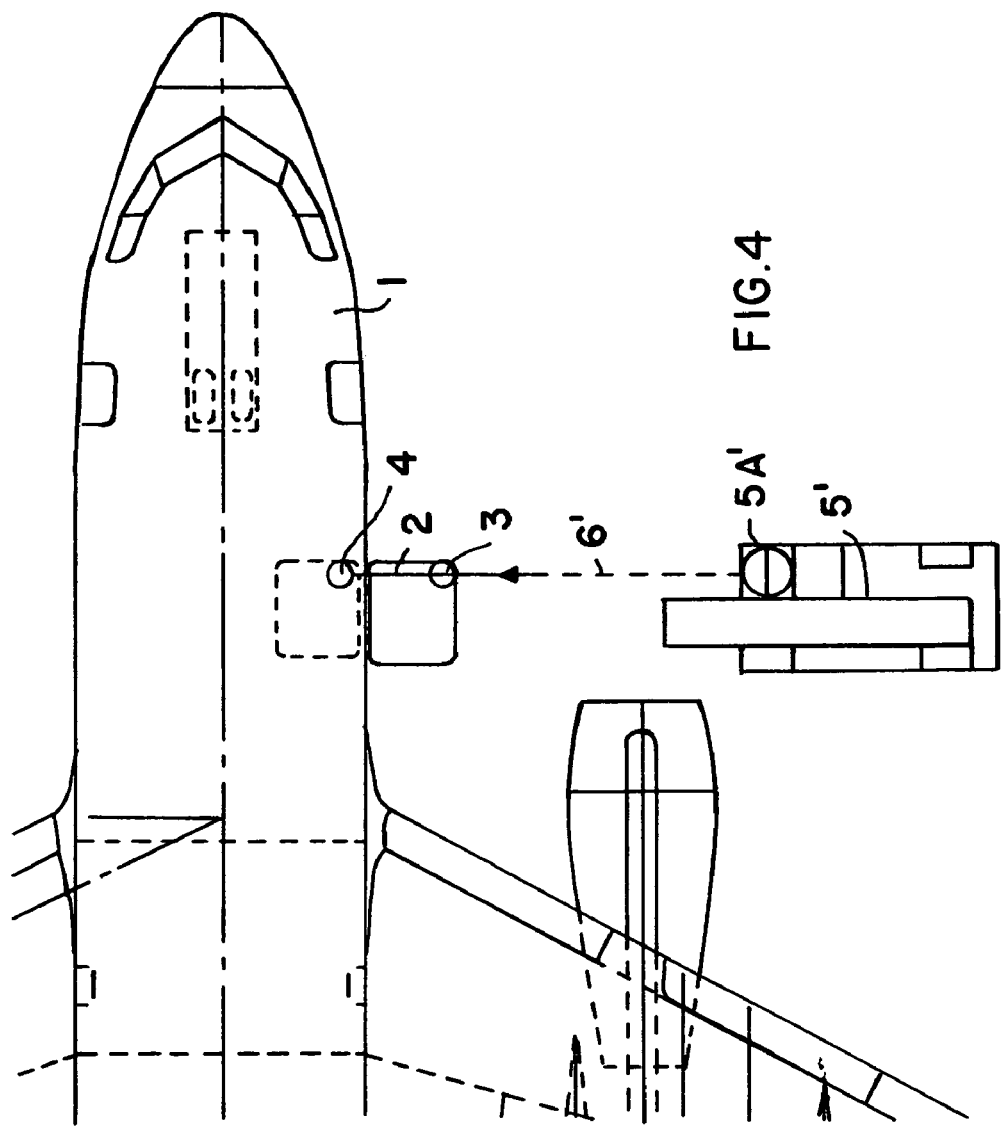
FIG. 4 is a top plan view similar to FIG. 2, but showing an alternative position of the marker lights for a vehicle with the driver position on the right side rather than the left side.

While FIG. 2 shows an arrangement of the marker lights 3 and 4 providing a safe approach path 6 for a vehicle 5 having the driver 5A seated at the left side thereof, FIG. 4 shows an arrangement of the marker lights 3 and 4 for providing a safe approach path 6' for a different vehicle 5' having the driver 5A' seated on the right side thereof. As explained above, the only difference between the guidance system of FIG. 2 and the guidance system of FIG. 4 relates to the different pre-defined locations of the marker lights 3 and 4. Otherwise, the systems have the same construction, function and operation.

Figure 5:
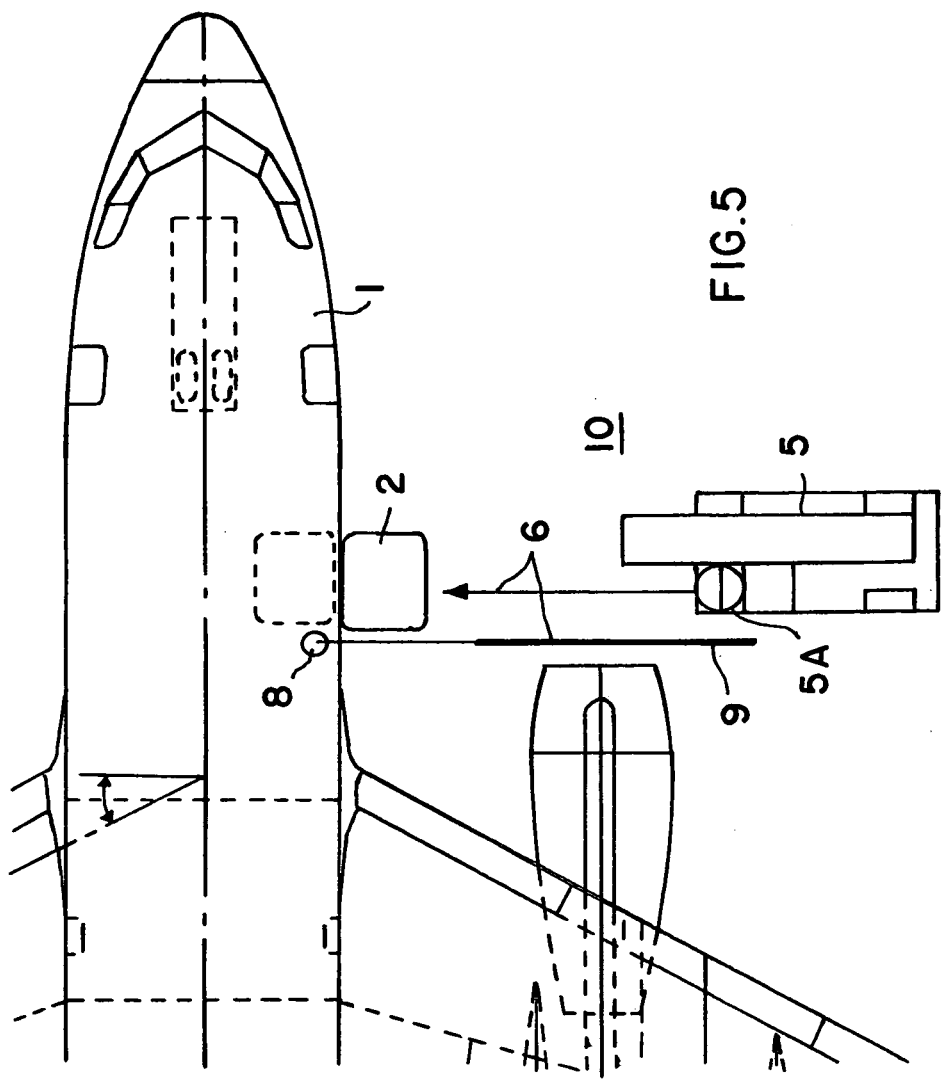
FIG. 5 is a schematic top plan view of a portion of an aircraft equipped with a second embodiment of the inventive guidance system involving a light projection arrangement, for a perpendicular approach path of the service vehicle to the aircraft.

FIG. 5 schematically shows a second embodiment of the inventive guidance system, in which a light projector arrangement 8 is mounted on the aircraft 1 next to the cargo loading door 2. The projector arrangement 8 projects light onto the ground surface 10 on which the aircraft 1 is parked and on which the vehicle 5 drives to approach its parking position adjacent to the aircraft. Particularly, this projected light from the projector arrangement 8 forms a prescribed light pattern on the ground surface 10 in an area adjacent to the aircraft 1, so that the light pattern marks or defines a safe collision-free approach path for the vehicle 5 to approach its parking position. For example, in the particular embodiment of FIG. 5, the projected light forms at least one projected light line 9 that indicates a side boundary of the safe approach path on the ground surface 10. Thus, the driver 5A must simply drive the vehicle 5 along and to the right of the projected light line 9 without crossing to the left over the projected light line 9. Thereby it will be ensured that the vehicle 5 does not cross out of the safe zone or safe approach path into a zone of collision danger. In this manner, the projected light line 9 defines a safe approach path 6 by clearly marking a side boundary thereof.

While FIG. 5 shows a perpendicular approach path 6 extending toward the aircraft 1 at a perpendicular angle relative to the aircraft longitudinal axis, FIG. 6 shows this embodiment with the light projector arrangement 8 oriented to define a non-perpendicular steeply angled approach path 7 toward the aircraft 1 by projecting a light line 9 at such an angle onto the ground surface 10.

In the embodiment of both FIGS. 5 and 6, the light projector arrangement 8 comprises a light source such as a laser, a flash lamp, light emitting diodes, incandescent lamps, discharge lamps, or the like, as well as auxiliary optical devices such as lenses, optical apertures or diaphragms, or the like for projecting the intended pattern of projected light onto the ground surface 10.

As a further alternative, FIG. 7 shows a light projector arrangement 8' that is arranged on the aircraft 1, e.g. next to the cargo loading door, and that projects an illuminating beam 12 of light onto the ground surface 10 not as a side boundary line 9 as in the arrangements of FIGS. 5 and 6, but rather as an area illumination of a defined safe zone 10' on the ground surface 10. This illuminated safe zone 10' on the ground surface 10 thus defines the safe approach path on which the vehicle 5 may drive without risk of a collision with any part of the aircraft 1. In other words, if the driver simply steers the vehicle to remain within the clearly defined illuminated safe zone, then there will be no risk of a collision.

A further alternative is also shown in FIG. 7, whereby the light projector arrangement or device 8" is arranged at the bottom of the forward end of the engine nacelle 13 of an engine of the aircraft. In this position, the light projector arrangement 8" can easily project illuminating light onto the safe zone 10' or as a boundary marker line 9 (see FIGS. 5 and 6) on the ground surface 10 to mark the safe approach path. Also in this position, the light projector arrangement 8" will not cause any glare or blinding projection of the emitted light directly into the eyes of the driver of the vehicle.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A guidance system for guiding an aircraft service vehicle to a prescribed parking position adjacent to an aircraft, comprising first and second indicator markers arranged spaced apart from one another on said aircraft, wherein said indicator markers are positioned relative to one another to present a first prescribed visual pattern of said indicator markers along a first line of sight defining a first safe approach path for a driver of said service vehicle to follow when driving said service vehicle to said prescribed parking position, and wherein said indicator markers do not present said prescribed visual pattern away from said line of sight defining said safe approach path.

2. The guidance system according to claim 1, further in combination with said service vehicle and said aircraft, wherein said indicator markers are positioned dependent on locations of parts of said aircraft and dependent on a configuration and dimensions of said service vehicle so that a collision of said service vehicle with any of said parts of said aircraft will be surely avoided if said driver follows said safe approach path when driving said service vehicle to said prescribed parking position.

3. The guidance system according to claim 1, wherein said prescribed visual pattern comprises a superimposed registration of said indicator markers one behind the other along said line of sight.

4. The guidance system according to claim 1, wherein said prescribed visual pattern comprises an apparent vertical alignment of said indicator markers one above the other along said line of sight.

5. The guidance system according to claim 1, wherein said first and second indicator markers respectively comprise first and second marker lights.

6. The guidance system according to claim 5, wherein said first and second marker lights respectively comprise at least one of light emitting diodes and luminescent lamps.

7. The guidance system according to claim 1, wherein said first and second indicator markers are positioned with a horizontal spacing distance of at least 1 meter therebetween.

8. The guidance system according to claim 1, wherein said first indicator marker is arranged on a cargo hold door of said aircraft and said second indicator marker is arranged in a cargo hold of said aircraft.

9. The guidance system according to claim 8, wherein said first indicator marker is arranged at a free swinging edge of said cargo hold door opposite a hinged edge of said cargo hold door.

10. The guidance system according to claim 1, wherein at least one of said indicator markers is arranged on at least one of a cargo hold door threshold, a fuselage side surface, and a fuselage belly surface of said aircraft.

11. The guidance system according to claim 1, further comprising third and fourth indicator markers arranged spaced apart from one another on said aircraft so as to present a second prescribed visual pattern of said third and fourth indicator markers along a second line of sight distinct from said first line of sight and defining a second safe approach path distinct from said first safe approach path.

12. A guidance system for guiding an aircraft service vehicle to a prescribed parking position on a ground surface adjacent to an aircraft, comprising a light projector device that is mounted on said aircraft and that is adapted and oriented to project a light pattern onto said ground surface, wherein said light pattern defines a safe approach path on which said vehicle may be driven to said prescribed parking position without colliding with said aircraft.

13. The guidance system according to claim 12, wherein said light pattern comprises at least one elongated projected light line.

14. The guidance system according to claim 13, wherein said projected light line defines a side boundary of said safe approach path.

15. The guidance system according to claim 12, wherein said light pattern comprises a distinctly illuminated area on said ground surface corresponding to said safe approach path.

16. The guidance system according to claim 12, wherein said light projector device comprises a light source adapted to emit light and an optical arrangement including at least one of a lens, a collimator, an aperture, a diaphragm, and a shutter adapted to project said light in said light pattern onto said ground surface.

17. The guidance system according to claim 12, wherein said light projector device comprises a light source selected from the group consisting of flash lamps, lasers, light emitting diodes, incandescent lamps, and discharge lamps.

18. The guidance system according to claim 12, wherein said light projector device is mounted on a side of a fuselage next to a cargo hold door of said aircraft.

19. The guidance system according to claim 12, wherein said light projector device is mounted on an engine nacelle of an engine of said aircraft.

* * * * *